O. A. NORLUND.
NUT LOCK.
APPLICATION FILED SEPT. 9, 1910.
1,020,438.
Patented Mar. 19, 1912.
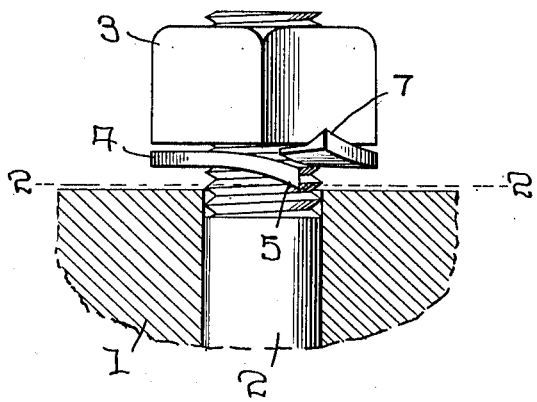
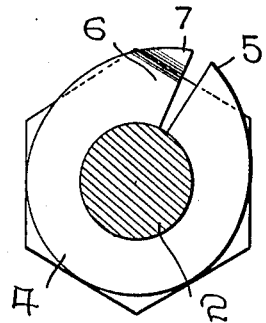
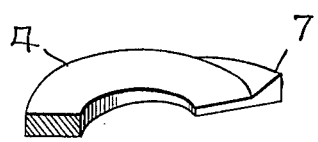
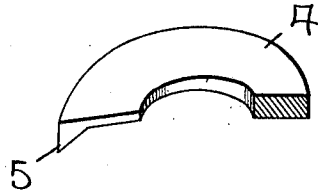
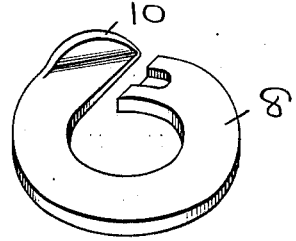
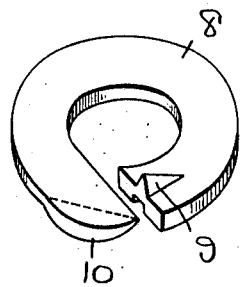
WITNESSES:
INVENTOR
O. A. Norlund
BY
W. J. Fitzgerald & Co
Attorneys

UNITED STATES PATENT OFFICE.

OLOF A. NORLUND, OF WILLIAMSPORT, PENNSYLVANIA.

NUT-LOCK.

1,020,438. Specification of Letters Patent. Patented Mar. 19, 1912.

Application filed September 9, 1910. Serial No. 581,137.

*To all whom it may concern:*

Be it known that I, OLOF A. NORLUND, a citizen of the United States, residing at Williamsport, in the county of Lycoming and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to certain new and useful improvements in nut locks, and more particularly to that class of nut locks in which a spring locking washer is arranged upon the bolt under the nut, which is so constructed that when the nut is screwed up tight the washer will engage the member to be secured and the nut in such a manner that the same will be prevented from working loose.

Another object of my invention is to provide a split washer which is enlarged or forced outwardly at the split portion one end being swaged downwardly and the other upwardly. The upwardly extending end having a lip adapted to engage the nut and the downwardly extending end being provided with a biting point for engaging the member to be secured.

A still further object of my invention is to provide a split spring washer designed normally spiral, whereby when the nut is forced to its effective position, it will have a tendency to position the ends of the washer in alinement with one another without materially affecting the locking members.

With these objects in view, the invention consists of the novel features of construction, combination and arrangement of parts, hereinafter fully described and pointed out in the claims.

In the drawing forming a part of this specification:—Figure 1 is a side elevation of my improved nut lock showing the application of the same. Fig. 2 is a section taken on line 2—2 of Fig. 1. Fig. 3 is a detail perspective view of a portion of the lock washer. Fig. 4 is a perspective view of the same, shown in an inverted position, Fig. 5 is a perspective view of the modification, and, Fig. 6 is an inverted perspective of the same.

Referring to the drawing, 1 indicates the member to be secured, 2 the bolt, and 3 a nut mounted thereon, the above description being given so that the operation of my improved nut lock can be readily understood.

The lock comprises a split spring washer 4 adapted to be arranged over the bolt under the nut 3, and said washer is rolled or forced outwardly at the split end so as to enlarge the same, and the respective ends are forced outwardly in opposite directions, as clearly shown, the end 5 forming a biting member adapted to engage the member to be secured, and the end 6 is provided with a lip 7 adapted to extend up alongside of the nut in such a manner that when the nut is screwed down tightly on the bolt the nut will be prevented from turning. The lip 7 is provided with a cam face for allowing the nut to ride over the same when being tightened, and it will be seen that after the nut has been tightened the washer will be locked by the biting member and the lip will extend up alongside of the nut in such a manner that it will be impossible for the same to be unscrewed without the use of a wrench. The biting member 5 and the lip 7 in this form of washer, are preferably semi-V-shaped in cross section, the base of these members being preferably flush with the meeting ends of the washer.

In the modification shown in Figs. 5 and 6, the washer 8 is also split, as shown, and one of the split ends is swaged and extended upwardly to form a securing lip 10, which lip will prevent the casual rotation of the nut. The opposite end portion of the washer is provided with a biting member 9, which is preferably placed at the transverse center of the end portion, said biting member being substantially V-shaped in cross section, the side walls converging at the inner end thereof. The member 9 is formed integral with the washer and is preferably formed by displacing a portion of the body of the washer and in this instance the base of the member 9 is placed flush with the end member of the washer upon which it is formed.

From the foregoing description, it will be seen that I have provided a spring washer nut lock, which is so constructed that the same can be readily attached or detached to an ordinary securing bolt, whereby the tightening of the nut thereon will cause the washer to be locked by the member and prevent the same from turning, said washer carrying means for holding the nut against turning rearwardly. It will be further seen that by designing the washer spirally and providing the locking members at the outer edges of the ends, that a nut forced thereover will have a tendency to force the ends of said washer in alinement with one another without materially affecting said locking members, and it will still further be seen that by so designing the washer, a great leverage will be gained from the center of the washer to its ends, which adds greatly to its effectiveness in operation.

What I claim is:—

1. A nut lock, comprising a spiral spring washer, the outer edge of said washer being substantially of the same thickness throughout its length, the inner edge of the outermost ends at the split of said washer being thinned, and locking members formed on the ends of said washer and extending in opposite directions.

2. A nut lock, comprising a substantially spirally arranged spring washer, the outer periphery of said washer being substantially of the same thickness throughout its length, the inner periphery of the ends of said washer being thinned, said ends of the washer being swaged and tapered sharply from the outer periphery to the thinned portion thereof, the tapering surface being in a plane oblique to the face of said washer and substantially tangential to the inner periphery thereof.

In testimony whereof I have signed my name to this specification in the presence of two subscribing witnesses.

OLOF A. NORLUND.

Witnesses:
R. E. PRUTSMAN,
E. M. GRIGGS.